United States Patent
Boehl et al.

(10) Patent No.: US 8,108,716 B2
(45) Date of Patent: Jan. 31, 2012

(54) METHOD AND DEVICE FOR MONITORING FUNCTIONS OF A COMPUTER SYSTEM

(75) Inventors: Eberhard Boehl, Reutlingen (DE);
Juergen Sauler, Stuttgart (DE);
Reinhard Weiberle, Vaihingen/Enz (DE); Bernd Mueller,
Leonberg-Silberberg (DE); Yorck von Collani, Beilstein (DE); Rainer Gmehlich, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 1 day.

(21) Appl. No.: 11/990,097

(22) PCT Filed: Jul. 27, 2006

(86) PCT No.: PCT/EP2006/064742
§ 371 (c)(1),
(2), (4) Date: Apr. 12, 2010

(87) PCT Pub. No.: WO2007/017396
PCT Pub. Date: Feb. 15, 2007

(65) Prior Publication Data
US 2010/0192021 A1 Jul. 29, 2010

(30) Foreign Application Priority Data
Aug. 8, 2005 (DE) .......................... 10 2005 037 230

(51) Int. Cl.
*G06F 11/00* (2006.01)
(52) U.S. Cl. .............. 714/11; 714/19; 714/10; 712/229; 713/300
(58) Field of Classification Search .................... 714/10, 714/19; 712/229; 713/300
See application file for complete search history.

(56) References Cited

U.S. PATENT DOCUMENTS

| 5,233,615 | A | 8/1993 | Goetz |
| 5,751,932 | A | 5/1998 | Horst et al. |
| 6,615,366 | B1 | 9/2003 | Grochowski et al. |
| 6,640,313 | B1 | 10/2003 | Quach |
| 7,134,047 | B2 | 11/2006 | Quach |
| 2002/0073357 | A1 | 6/2002 | Dhong et al. |
| 2004/0006722 | A1 | 1/2004 | Safford |

(Continued)

FOREIGN PATENT DOCUMENTS
DE 10349581 5/2005
(Continued)

OTHER PUBLICATIONS

International Search Report, PCT International Patent Application No. PCT/EP2006/064742, dated Aug. 31, 2007.

(Continued)

*Primary Examiner* — Robert Beausoliel, Jr.
*Assistant Examiner* — Jeison C Arcos
(74) *Attorney, Agent, or Firm* — Kenyon & Kenyon LLP

(57) ABSTRACT

A method and device for monitoring functions of a computer system having at least two execution units, a switchover unit being provided, and switchover operations being carried out between at least two operating modes, and a comparison unit being provided, a first operating mode corresponding to a comparison mode and a second operating mode corresponding to a performance mode, and a first function being monitored by a second function, the second function being executed in the comparison mode on at least two execution units, and each of these two second functions, which are executed on at least two execution units, monitoring the same first function.

10 Claims, 6 Drawing Sheets

U.S. PATENT DOCUMENTS

| | | | |
|---|---|---|---|
| 2004/0019771 A1* | 1/2004 | Quach | 712/229 |
| 2006/0288243 A1* | 12/2006 | Kim | 713/300 |
| 2007/0245133 A1 | 10/2007 | Weiberle et al. | |
| 2007/0255875 A1* | 11/2007 | Weiberle et al. | 710/116 |
| 2007/0277023 A1* | 11/2007 | Weiberle et al. | 712/229 |
| 2008/0270660 A1* | 10/2008 | Weiberle et al. | 710/261 |

FOREIGN PATENT DOCUMENTS

| | | |
|---|---|---|
| JP | 8-297588 | 11/1996 |
| JP | 2004-259137 | 9/2004 |
| WO | WO 0146806 | 6/2001 |
| WO | WO 03010638 | 2/2003 |
| WO | WO 2005/045664 | 5/2005 |
| WO | WO2007/017396 | 2/2007 |

OTHER PUBLICATIONS

Jones D. "Fehlertoleranz und Zuverässigkeit in Mikroprozessor-Systemen/Am Beispiel der Famlie MC88000" Elektronik WEKA Fachzeitschriftenverlag Poing, DE; pp. 54-60; Nov. 23, 1990, XP000172269.

* cited by examiner

METHOD AND DEVICE FOR MONITORING FUNCTIONS OF A COMPUTER SYSTEM

BACKGROUND INFORMATION

In the field of embedded systems, for example in automotive engineering or automation engineering, there are applications where an error in the μC hardware can potentially have safety-critical consequences. To avoid these consequences or minimize their effect, monitoring measures for detecting errors are employed. There are applications where such monitoring is required on a virtually permanent basis; in other applications, monitoring functions regularly check (i.e., periodically) or in response to specific prompts, whether the computer or other components as well are still functioning correctly. The present invention is directed to such applications.

The monitoring functions in these applications include the execution of a check routine, for example, to check whether a specific component is still functional. This can involve calculating a part of the real functional algorithm using default input values and then comparing the result, that is known, to a stored reference value. This stored reference value can be calculated in advance since the default input values and the algorithm are already known at the time the software is set up.

Another type of monitoring function is implemented by selectively loading output channels. This is potentially combined with a process of reading back sensor values which should then reside within a specific range. There are also a multiplicity of other variations.

All of these monitoring methods have in common that they are executed and controlled by software (possibly with the aid of a μC-external hardware module) and that they check the operability of the system.

In the case of the test measures under consideration, great care should be taken to ensure that an error in the μC core, which, after all, influences all of the software, does not cause the monitoring routine itself to malfunction. It is particularly with regard to verifiability that it should be ensured when assessing a measure that the core itself and the check software running thereon are operating correctly. Under this condition, it can be verified that the check routines themselves are also running correctly. Overall, therefore, substantial outlay is expended to check the core itself and to check that the other check routines are independent of core errors.

In automation technology, it is customary to speak of what are known as security functions. These functions are to be uniquely identified and documented in the overall application and typically need to meet the requirements of a standard (for example, IEC 61508). Even if no standard applies, rigorous demands in terms of fault detection are made of these security functions, and it is not always possible to execute a monitoring function on the object to be monitored.

Moreover, when testing operability using the conventional test measures, this test is often directed only to the operability in one specific context. This means it is often not the operability in each or in the currently valid context that is monitored, rather, it is the operability in only one default context that is checked.

SUMMARY

An object of the present invention is to improve the security of embedded systems by making it possible to test operability in a context-dependent process and thereby improve the quality of monitoring functions. Moreover, it makes feasible for security functions to be performed on a control computer, and possible preferred implementations for security functions are to be indicated. Another objective is to reduce the outlay expended in the development, as well as in the operation of software-implemented monitoring functions.

Thus, it is an advantage of the present invention that the correct and error-free (with respect to hardware errors) functioning of the monitoring functions is checked during execution of the same. Thus, one is able to detect errors in the monitoring function. As a result, substantially simplified security is made possible. In this case, a software-implemented monitoring achieves a 100% degree of coverage with respect to execution unit errors which, if at all, are manifested in the functioning. A process that checks operability while incorporating context is made possible. Less effort is entailed in developing a conceptual design for security. The overall system complexity is reduced. It may be readily expanded to allow other security-related functions to be performed in the comparison mode. This allows security functions to be implemented more simply and to be executed concurrently in a special mode on a control computer.

An example method for monitoring functions of a computer system having at least two execution units is advantageously described, switchover operations being carried out between at least two operating modes, and a first operating mode corresponding to a comparison mode, and a second operating mode corresponding to a performance mode, and a first function being monitored by a second function, characterized in that the second function is executed in the comparison mode on at least two execution units, and each of these two second functions, which are executed on at least two execution units, monitor the same first function.

An example method is advantageously described, characterized in that the second function periodically monitors the first function.

An example method is advantageously described, characterized in that the first function is executed in the performance mode.

An example method is advantageously described, characterized in that results obtained during execution of the second function on the at least two execution units are mutually compared in each instance, and the second function is monitored in this manner.

An example method is advantageously described, characterized in that the second functions on the at least two execution units are executed on the basis of context-dependent values, and results obtained during the process are compared.

An example method is advantageously described, characterized in that, besides the second function, additional functions are provided that monitor other functions, only some of the additional functions being executed in the comparison mode on the at least two execution units and thus being checked themselves.

An example device for monitoring functions of a computer system having at least two execution units is advantageously provided, a switchover element being provided, and switchover operations being carried out between at least two operating modes, and a comparator being provided, a first operating mode corresponding to a comparison mode and a second operating mode corresponding to a performance mode, and a first function being monitored by a second function, characterized in that the device is designed in such a way that the second function is executed in the comparison mode on at least two execution units, and each of these second functions, which are executed on at least two execution units, monitor the same first function.

An example device is advantageously provided, characterized in that it is designed in such a way that results obtained during execution of the second function on the at least two execution units are mutually compared in each instance by a comparator, and the second function is monitored in this manner.

An example device is advantageously provided, characterized in that it is designed in such a way that the second functions on the at least two execution units are executed on the basis of context-dependent values, and results obtained during the process are compared.

An example device is advantageously provided, characterized in that it is designed in such a way that, besides the second function, additional functions are provided that monitor other functions, only some of the additional functions being executed in the comparison mode on the at least two execution units and thus being checked themselves.

An example device is advantageously provided, characterized in that the switchover element and the comparison element are combined in one switchover and comparison unit.

An example device is advantageously provided, characterized in that the switchover and comparison unit performs the monitoring of the second function.

DETAILED DESCRIPTION OF EXAMPLE EMBODIMENTS

In the following, an execution unit may denote both a processor/core/CPU, as well as an FPU (floating point unit), a DSP (digital signal processor), a co-processor or an ALU (arithmetic logical unit).

Figure 1:
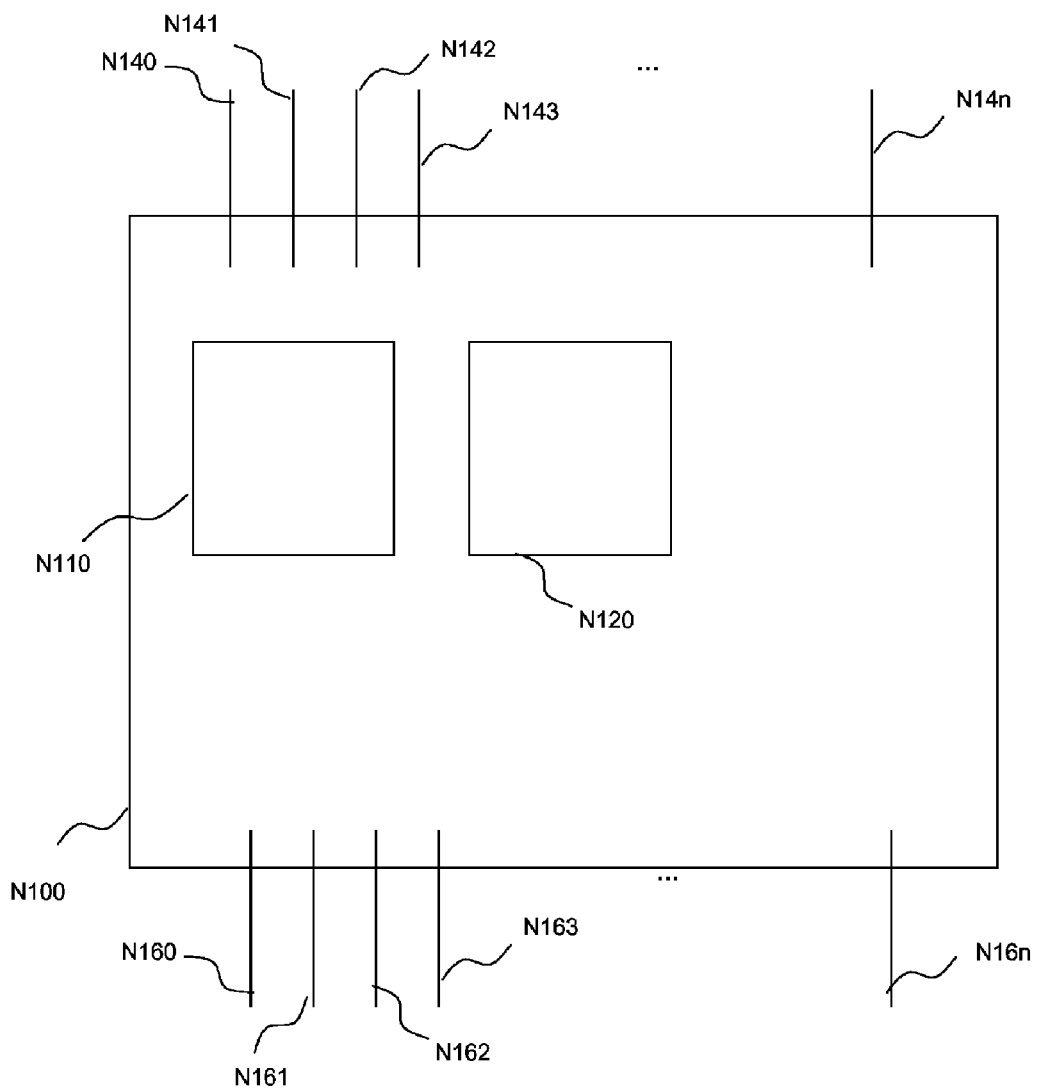
FIG. 1 shows a generalized representation of a switchover and comparison unit.
Figure 6:
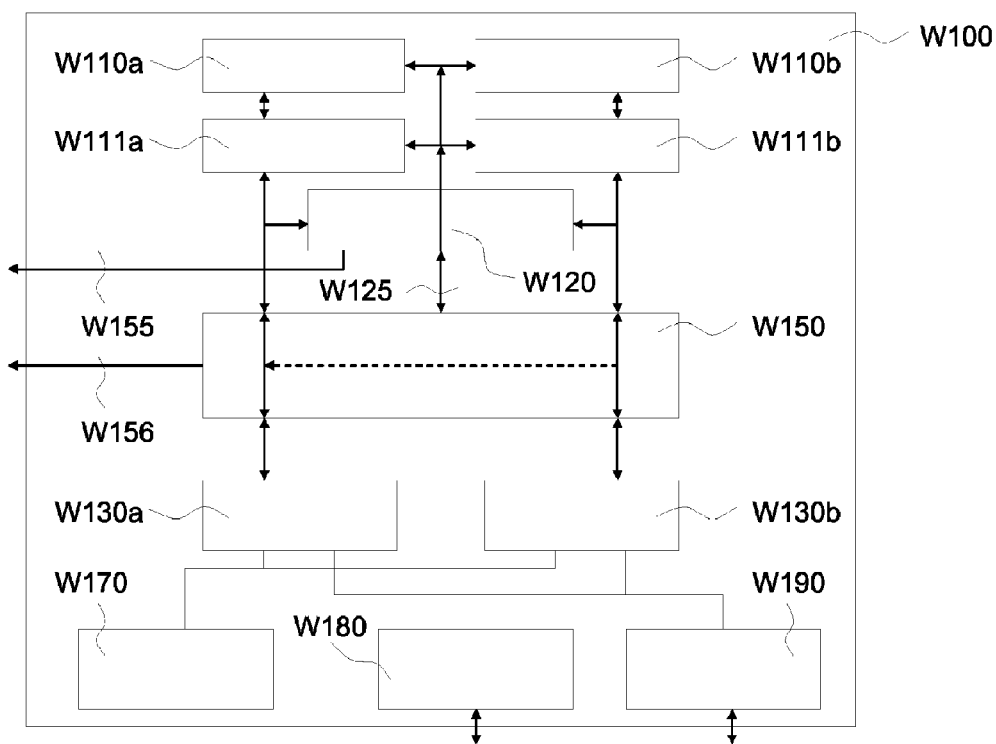
FIG. 6 shows a multiprocessor system having two execution units.

The present invention relates to a multiprocessor system W100, as shown in FIG. 6, having at least two execution units W110a, W110b, a comparison unit W120, and a switchover unit W150. In this figure, the principle of a switchable multiprocessor system is described with reference to a dual-processor system. Accordingly, the general case of a switching and comparison unit for more than two execution units is illustrated in FIG. 1. In this context, the present invention described here relates to the general case involving two or more execution units. The execution units in FIG. 6 are each linked via an optional intermediate memory W111a, W111b to a comparison unit W120 and a switchover unit W150. Switchover unit W150 has at least two outputs leading to two system interfaces W130a, W130b. Via these interfaces, registers, memories or peripherals, such as digital outputs, D/A converters, and communications controllers, may be controlled. This multiprocessor system may be operated in at least two operating modes, one comparison mode CM and one performance mode PM. In a performance mode PM, different instructions, program segments or programs are executed in parallel in the different execution units. In this operating mode, the comparison unit is deactivated. In this operating mode, switchover unit W150 is configured in such a way that each execution unit is linked via the optional intermediate memory to one of system interfaces W130a, W130b. Via the system interfaces, a result obtained from an execution unit may be written to a memory W170 or output to a peripheral module W180, W190. A peripheral module may be an analog-digital converter or a communications controller of a communications system (for example, SPI, LIN, CAN, FlexRay). There are several options for deactivating the comparison unit. On the one hand, a signal may be transmitted to the comparator, to activate or deactivate the same. To this end, an additional logic capable of effecting this is to be added to the comparator. Another option provides for not supplying any data for comparison to the comparator. A third option provides for ignoring the error signal of the comparator at the system level. In addition, the error signal itself may also be interrupted. Common to all of the options is that they produce a state in the system where it is of no consequence when two or more data to be potentially compared, differ. If this state is reached by a measure in the comparator or in the input or output signals thereof, then the comparator is described as passive or deactivated. In a comparison mode CM, the same or substantially similar instructions, program segments or programs are processed in both execution units W110a, W110b. The output signals of the execution units are transmitted via optional intermediate memories W111a, W111b to comparison unit W120 and to switchover unit W150. The two data are checked for conformity in the comparison unit. Once the comparison is carried out, the switchover unit is informed via a status signal W125 whether it is allowed to output one of the corresponding results to one of the system interfaces or whether it is required to block the signal due to a detected discrepancy in the results. In such a case, an optional error signal W155 may be output by the comparison unit. Instead of being output by the comparison unit, this error signal may also be output W156 by switchover unit. In this context, the switchover operation may be triggered by the execution of special switchover instructions, special instruction sequences, explicitly identified instructions or in response to the accessing of a specific memory address by at least one of the execution units of the multiprocessor system.

In addition, FIG. 1 shows a generalized representation of a switchover and comparison unit, as should preferably be used. Of the n execution units to be considered, n signals N140, ..., N14n are transmitted to switchover and comparison component N100. From these input signals, this component is able to generate up to n output signals N160, ..., N16n. In the simplest case, the "pure performance mode," all signals N14i are routed to corresponding output signals N16i. In the opposite limiting case, the "pure comparison mode," all signals N140, ..., N14n are routed only to precisely one of output signals N16i.

This figure illustrates how the various possible modes may be produced. To this end, the logic component of a switching logic N110 is included in this figure. To begin with, it specifies how many output signals there actually are. In addition, switching logic N110 specifies which input signals contribute to which ones of the output signals. In this context, one input signal may contribute to precisely one output signal. Formulated mathematically, the switching logic thus defines a function that assigns one element of set {N160, N16n} to each element of set {N140, N14n}.

For each of outputs N16i, processing logic N120 then establishes the form in which the inputs contribute to this output signal. To describe the different possible variations exemplarily, it is assumed, without limiting universality, that output N160 is generated by signals N141, ..., N14m. If m=1, this simply corresponds to the signal being switched through;

if m=2, then signals N141, N142 are compared. This comparison may be implemented synchronously or asynchronously; it may be performed on a bit-by-bit basis, or only for significant bits or also using a tolerance range.

In the case that m≧3, a plurality of options is provided. One first option provides for comparing all of the signals, and, in response to the existence of at least two different values, for an error to be detected, which may optionally be signaled. A second option provides for making a k-out-of-m selection (k>m/2). This may be implemented through the use of comparators. An error signal may be optionally generated if it is ascertained that one of the signals is deviant. A potentially different error signal may be generated if all three signals differ. A third option provides for feeding these values into an algorithm. This may take the form of generating an average value, a median value, or of using a fault-tolerant algorithm (FTA), for example. Such an FTA is based on deletion of the extreme values of the input values and on a type of averaging of the remaining values. This averaging may be performed for the entire set of the remaining values or preferably for a subset that is readily generated by hardware. In such a case, it is not always necessary to actually compare the values. In the averaging operation, it is merely necessary to add and divide, for example; FTM, FTA or median value require partial sorting. If indicated, an error signal may be optionally output here as well, given high enough extreme values.

For the sake of brevity, these various mentioned options for processing a plurality of signals to form one signal are described as comparison operations.

Thus, the task of the processing logic is to establish the exact form of the comparison operation for each output signal, and thus also for the corresponding input signals. The combination of the information of switching logic N110 (i.e., the function named above) and of the processing logic (i.e., stipulating the comparison operation per output signal, i.e., per functional value) is the mode information, and this determines the mode. Generally, this information is naturally multi-valued, i.e., not representable by only one logic bit. Not all theoretically possible modes are practical in a given implementation; it is preferable to limit the number of permitted modes. In the case of only two execution units, where there is only one comparison mode, the entire information may be condensed into only one logic bit.

A switch from a performance mode to a comparison mode is generally characterized in that execution units, which, in the performance mode, are mapped to different outputs, are mapped to the same output in the comparison mode. This is preferably implemented by providing a subsystem of execution units, in which, in the performance mode, all input signals N14$i$, which are to be considered in the subsystem, are directly switched to corresponding output signals N16$i$, while, in the comparison mode, they are all mapped to an output. Alternatively, such a switchover operation may also be implemented by modifying pairings. The explanation therefor is that, generally, it is not possible to speak of the performance mode and the comparison mode, although, in one specific embodiment of the present invention, the number of permitted modes may be limited in such a way that this general case does apply. However, it is always possible to speak of a switch from a performance mode to a comparison mode (and vice versa).

Software-controlled switchover operations between these modes may be dynamically carried out during operation. In this context, the switchover operation is triggered by the execution of special switchover instructions, special instruction sequences, explicitly identified instructions or in response to the accessing of specific addresses by at least one of the execution units of the multiprocessor system.

One approach provides that the monitoring functions be executed in one comparison mode. In this context, a monitoring function is a function that checks the functioning or the performance reliability of a component, of a subsystem or of an object.

An example embodiment of the present invention is described in greater detail in the following.

Figure 2:
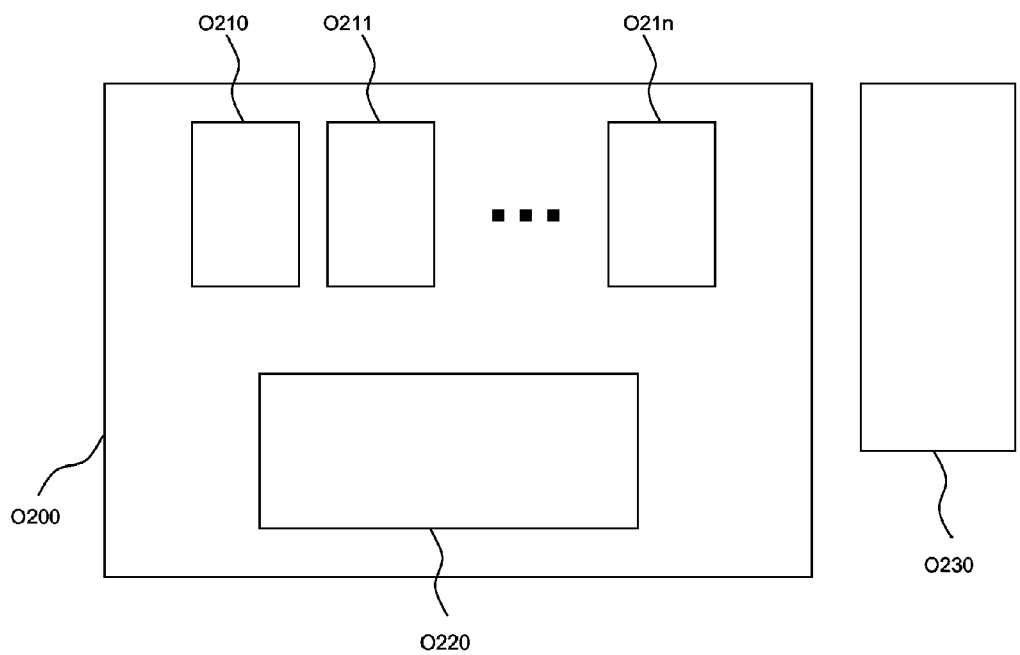
FIG. 2 illustrates those components that are present in the processing unit of the system according to an example embodiment of the present invention.

FIG. 2 illustrates those components that are present in the processing unit of the system according to an example embodiment of the present invention. Processing unit O200 itself includes a plurality of execution units O210, . . . , O21n. In addition, a switchover and comparison unit O220 is provided. It is preferably provided as a component in the processing unit. However, it may also be distributed over various components that are even located outside of the processing unit itself. Decisive is that the processing unit be able to provide the functions required by the switchover and comparison unit, as described, for example, in the description of FIG. 1. Moreover, functions that are preferably software-implemented are executed on this processing unit. These functions are drawn as block O230 in the figure next to processing unit O200, since, conceptually, they reside on a different viewing plane.

Figure 3:
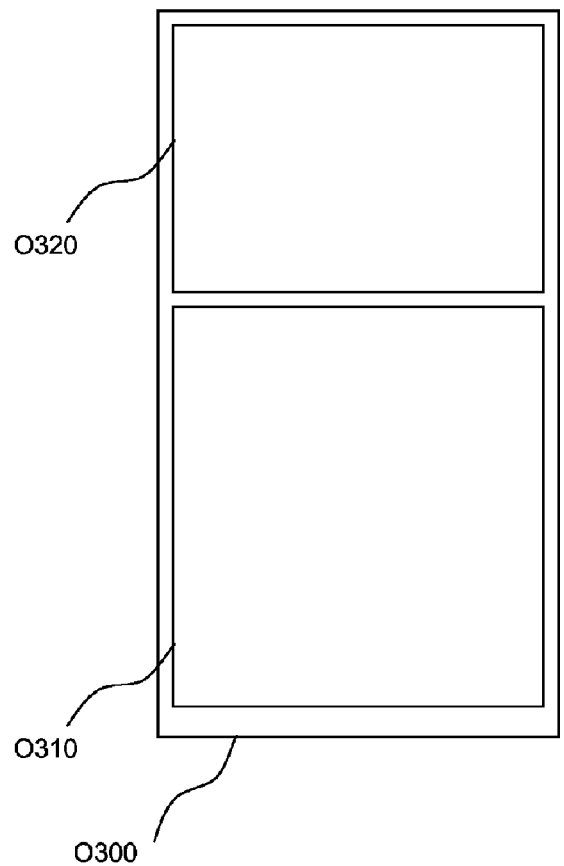
FIG. 3 shows a partitioning of the set of functions.

A partitioning of functions O230 is shown in FIG. 3. In this context, total set O300 of the functions corresponds to O230. These may be subdivided into monitoring functions O320 and other functions O310. In the simplest form of the fundamental idea, the monitoring functions are computed or performed in a comparison mode, while the other functions are performed in a performance mode.

The fundamental advantage derived in this case is that the correct and error-free (with respect to hardware errors) functioning of the monitoring functions is checked during execution of the same. In addition, errors in the monitoring function itself may be detected. As a result, substantially simplified security is made possible. In this case, a software-implemented monitoring achieves a 100% degree of coverage with respect to execution unit errors that, if at all, are manifested in the functioning. Since the monitoring functions described here are software-implemented, a precondition for correctly fulfilling their function is that the "brain" (the execution unit) on which they are executed be operating correctly. Besides the concurrent monitoring of this execution unit, the quality of the monitoring function itself is improved thereby. Since this problem (of having to concurrently monitor the execution unit) must always be resolved when developing a security concept, it is typically necessary for rather substantial outlay to be expended on detecting execution unit errors and on detecting monitoring function errors correlated therewith. This outlay is to be expended on development. However, it is also reflected in the system itself, in that it requires additional or more costly components and increases the complexity of the system. This tends, if anything, to negatively affect both the reliability as well as the security of the system. By employing the present invention as described here, less effort is entailed in developing the conceptual design for security or monitoring, and the entire complexity of the system is reduced. Besides achieving a cost reduction, the reliability and security of the system are indirectly improved as well.

Moreover, the present invention makes it possible to achieve a further significant improvement in the security in numerous applications by computing this monitoring function with reference to the current context. To verify the correctness of the monitoring function in the context of one execution of the monitoring function on only one execution unit, typically, it is necessary for a comparison to be made to a reference value that is known outside of the components considered here. In many application cases, this may only be realized by computing a default value that is stored in a non-volatile memory component. This value is calculated at the time of development, i.e., not during operation, and is thus only valid for the special context assumed here. Often, however, it is also the case that an error manifests itself only in a specific context. For example, it is not always possible to discover an error in a multiplication component by multiplying together two very specific numbers, and by comparing the result to the known and stored value. Frequently, the only effect it has is to produce an incorrect result in special combinations of input values. Thus, a monitoring function that is limited to such a default value has a reduced fault detection. The present invention makes it possible for the monitoring function to also be provided with context-dependent values since the requisite comparison for detecting errors in the execution units is made by the switchover and comparison unit.

In most applications, it is beneficial to compute the other functions O310 in a performance mode since the system performance is then optimized.

Figure 4:
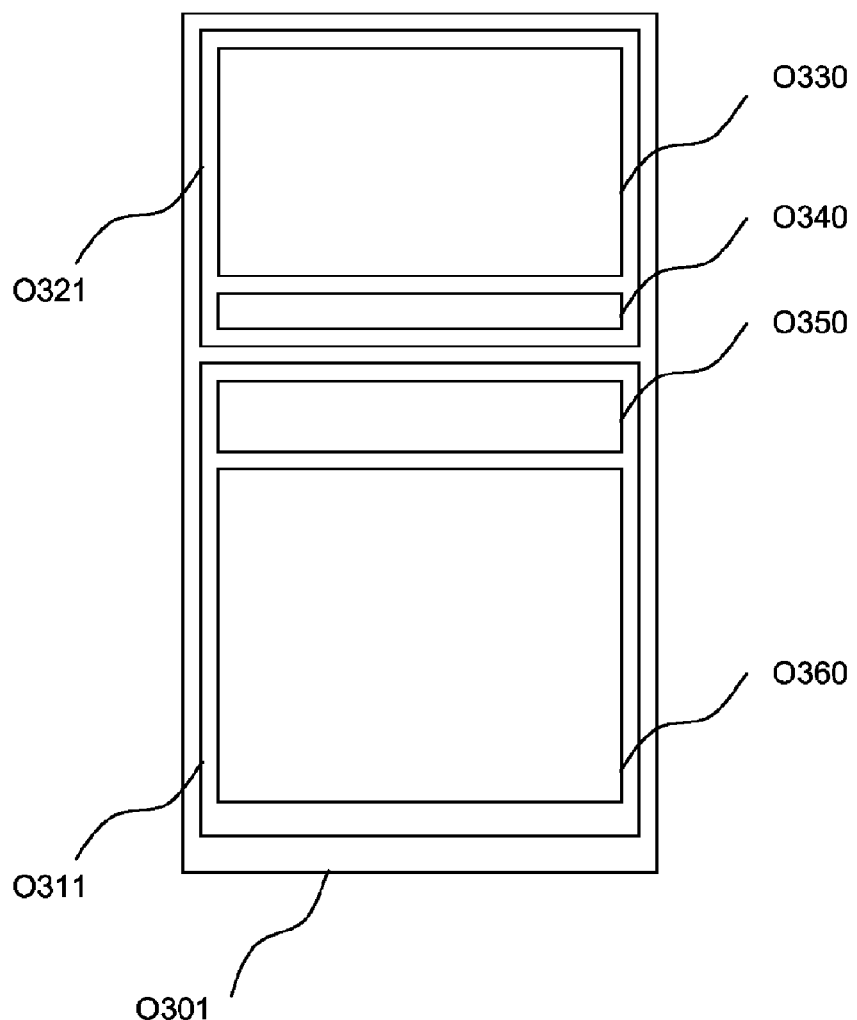
FIG. 4 illustrates an alternative partitioning of the set of functions.

A variation of this idea is illustrated in FIG. 4. The subsets O301, O311, O321 correspond to O300, O310, O320 from FIG. 3. The subsets O311 and O321 are divided once again into sets O350, O360, respectively, O330, O340. The underlying idea here is that not all monitoring functions need to be executed in the comparison mode, but rather, optionally only those for which the monitoring of the execution unit is important. They are designated by O330, while the other (preferably very small) subset of monitoring functions O340, for which the monitoring of the execution unit is not essential, is executed in a performance mode. The subdivision of O311 is to be understood accordingly: for example, O350 may be functions which directly drive a critical actuator. This means that it is also possible that some of the functions, which are not monitoring functions, be executed in a comparison mode. These are combined in O350. The remaining functions O360 are executed in a performance mode.

Figure 5:
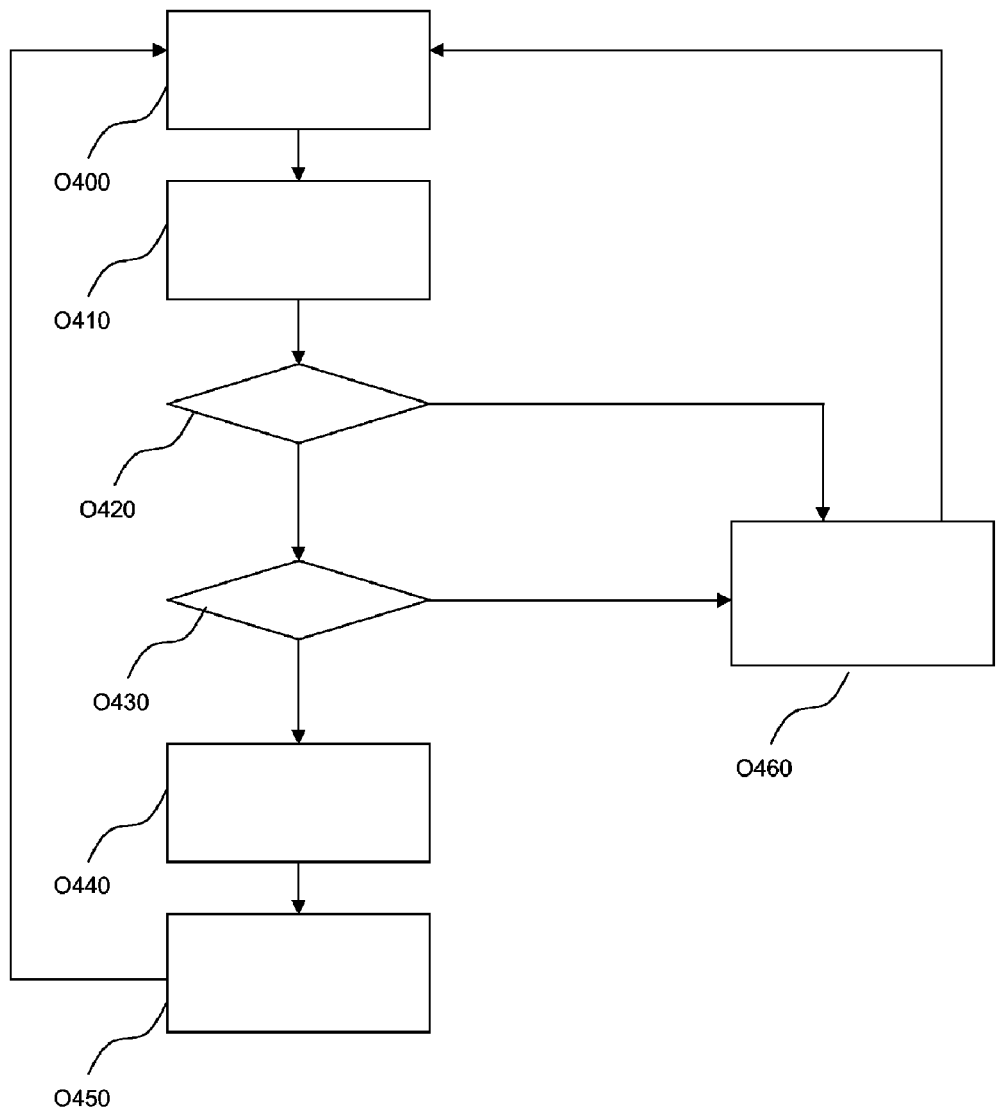
FIG. 5 shows the functional sequence of the decision process.

FIG. 5 illustrates the fundamental decision process for the preferred case that O340 is unoccupied and that there is only one performance and one comparison mode.

The precondition is that the set of monitoring functions be known O311. As a result, at the task/process/thread level (referred to in the following only as processes), one is able to differentiate between V processes that execute a monitoring function and others, referred to in the following as P processes. Among the P processes, there are also those which, although they are not directed to a monitoring function, nevertheless are to be computed in the comparison mode (they correspond to the functions of the subset O350). These are referred to in the following as PV processes.

In step O400, the "idle state" of the scheduler is assumed. As soon as the scheduler brings a process for scheduling in step O410, the decision as to whether it is a P process or a V process is to be made in step O420. In the case that it is a V process, it is processed in the comparison mode (in step O460). The scheduler then returns to its idle state (following step O400). In the case that it is a P process, it is to be checked next in step O430 whether it is a PV process. If this is the case, the process is executed in the comparison mode (in step O460). The scheduler then returns to its idle state (following step O400). If this is not the case, the process is executed in the performance mode (in step O440). In this case, an assignment to an execution unit must be undertaken in step O450. Subsequently thereto, the schedule returns again to its idle state (O400).

What is claimed is:

1. A method for monitoring functions of a computer system having at least two execution units, comprising:
    carryout out switchover operations between at least two operating modes, a first operating mode corresponding to a comparison mode in which the two execution units execute the same or substantially similar instructions, program segments or programs, and resulting output signals of the two execution units being mutually compared, and a second operating mode corresponding to a performance mode in which the execution units execute different instructions, program segments or programs in parallel; and
    executing a monitoring function that includes computer-executable instructions configured to check at least one of a functioning and a performance reliability of a component in the system via monitoring of a first function that is associated with the system component, the monitoring function being executed in the comparison mode on each of at least two of the execution units, wherein results obtained during execution of the monitoring function on each of the at least two execution units are mutually compared in each instance to provide simultaneous monitoring of the monitoring function and the first function, wherein the first function is executed separately from the monitoring function.

2. The method as recited in claim 1, wherein the monitoring function monitors the first function periodically.

3. The method as recited in claim 1, wherein the first function is executed in the performance mode.

4. The method as recited in claim 1, wherein the monitoring function on each of the at least two execution units are executed based on context-dependent values, and results obtained during the execution are compared.

5. The method as recited in claim 1, wherein, in addition to the monitoring function, additional functions are provided which monitor other functions, only those additional functions for which monitoring of the at least two execution units is deemed essential being executed in the comparison mode on the at least two execution units and thus being checked themselves.

6. A device for monitoring functions of a computer system having at least two execution units, comprising:
    a switchover unit adapted to carry out switchover operations between at least two operating modes, a first one of the operating modes corresponding to a comparison mode and a second one of the operating modes corresponding to a performance mode; and
    a comparison unit, wherein:
        a first function is associated with a component in the system,
        a second function includes computer-executable instructions configured to check at least one of a functioning and a performance reliability of the system component via monitoring of the first function,
        the device is adapted so that the second function executes in the comparison mode on each of at least two execution units,
        each of the second functions which are executed on at least two execution units monitor the same first function,
        results obtained during execution of the second function on the at least two execution units are mutually compared by the comparison unit to provide simultaneous monitoring of the second function and the first function, and the first function is executed separately from the second function.

7. The device as recited in claim 6, wherein the device is adapted so that the second function on each of the at least two execution units are executed based on context-dependent values, and results obtained during the execution are compared.

8. The device as recited in claim 6, wherein the device is adapted so that, in addition to the second function, additional functions are provided that monitor other functions, only those additional functions for which monitoring of the at least two execution units is deemed essential being executed in the comparison mode on the at least two execution units and thus being checked themselves.

9. The device as recited in claim 6, wherein the switchover unit and the comparison unit are combined in one switchover and comparison unit.

10. The device as recited in claim 9, wherein the switchover and comparison unit performs the monitoring of the second function.

* * * * *